Figure 3:
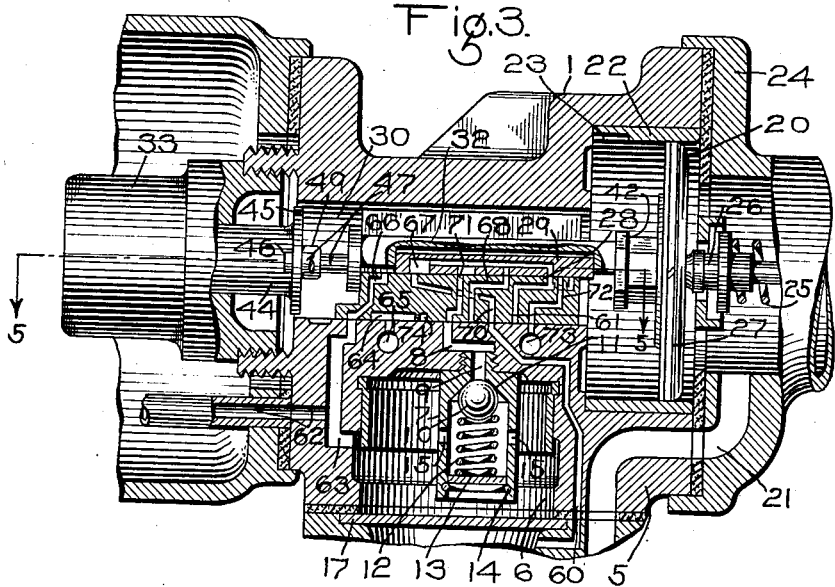

Oct. 19, 1937.  C. C. FARMER  2,096,488
FLUID PRESSURE BRAKE
Filed Sept. 3, 1936   2 Sheets-Sheet 1
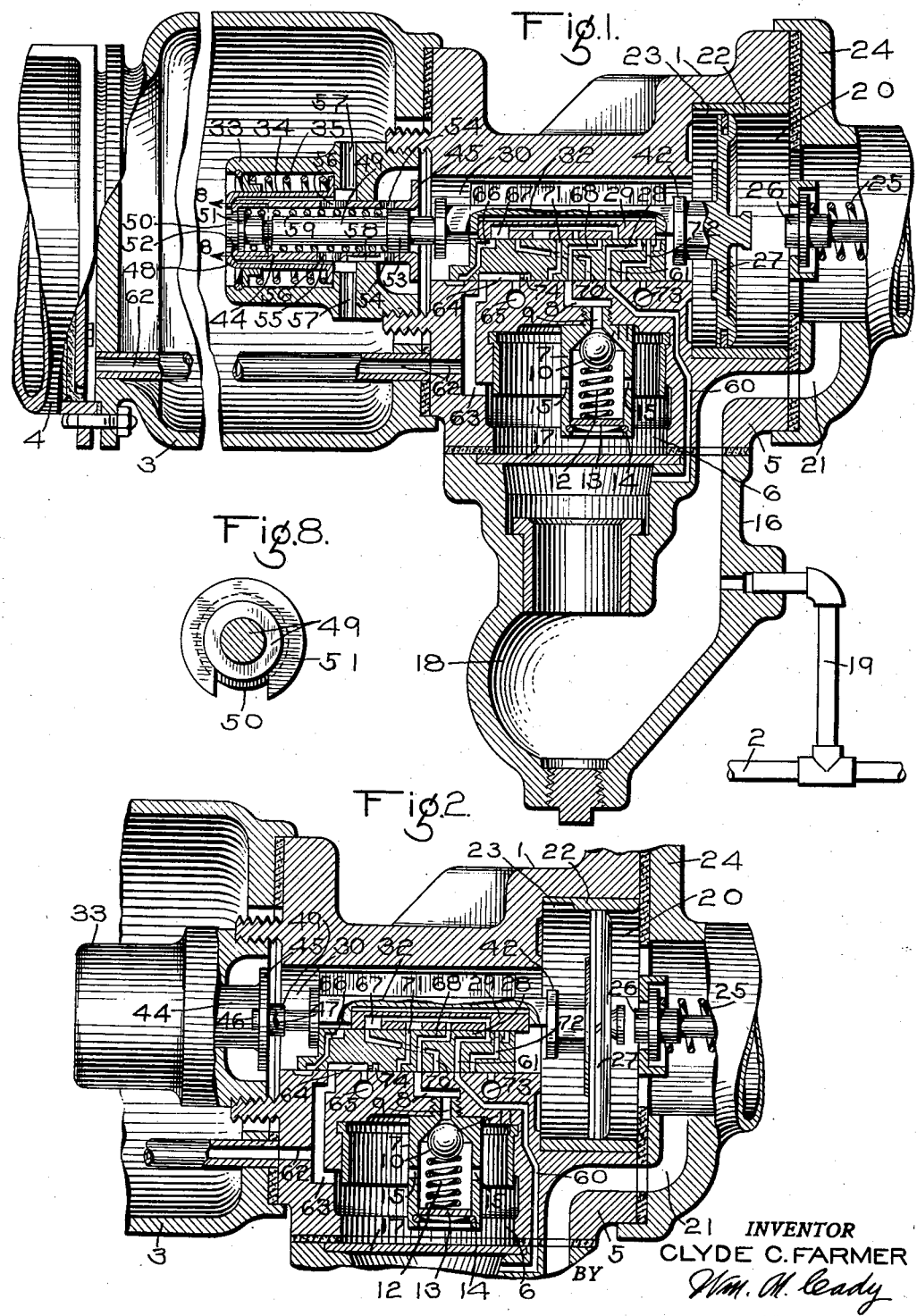

Oct. 19, 1937.   C. C. FARMER   2,096,488
FLUID PRESSURE BRAKE
Filed Sept. 3, 1936   2 Sheets-Sheet 2

INVENTOR
CLYDE C. FARMER
BY Wm. W. Cady
ATTORNEY

Patented Oct. 19, 1937

2,096,488

UNITED STATES PATENT OFFICE 2,096,488

FLUID PRESSURE BRAKE

Clyde C. Farmer, Pittsburgh, Pa., assignor to The Westinghouse Air Brake Company, Wilmerding, Pa., a corporation of Pennsylvania Application September 3, 1936, Serial No. 99,210

13 Claims. (Cl. 303—70)

This invention relates to fluid pressure brake equipment which is adapted to operate according to variations in brake pipe pressure to control the application and release of the brakes and more particularly to a triple valve device for such equipment of the modified K type such as is fully described in either of my Patents Nos. 1,986,469 and 1,986,470, issued January 1, 1935.

With the usual fluid pressure brake equipment difficulty is at times experienced in obtaining a sufficient increase in brake pipe pressure acting on one side of the triple valve piston over auxiliary reservoir pressure acting on the other side to move the piston and associated slide valve to release position to effect a release of the brakes. This is particularly true at the rear end of a long train where the rate of increase in brake pipe pressure is relatively slow and where leakage past the triple valve piston may be at a rate approaching the rate of increase in brake pipe pressure. Under such conditions the movement of the triple valve parts to release position will be either objectionably delayed or prevented depending upon the rate of such leakage.

In my aforementioned Patent No. 1,986,469 I have disclosed means whereby the above difficulty is overcome and whereby the triple valve parts are prevented from moving accidentally beyond service lap position to their release facilitating position under the influence of unavoidable fluctuations in brake pipe pressure when in effecting an application of the brakes the desired brake application is obtained and the engineer's brake valve device is moved to lap position. As shown in this patent, fluid under pressure is adapted to be vented from the slide valve chamber of the triple valve device to the atmosphere in releasing the brakes upon movement of the auxiliary slide valve relative to the main slide valve. As a further aid in facilitating the release of the brakes a fluid pressure controlled valve device is employed for temporarily separating the valve chamber of the triple valve device from the auxiliary reservoir when fluid under pressure is being vented from the valve chamber, so that the desired differential pressures may be obtained on the piston more quickly and without appreciable loss of auxiliary reservoir pressure. Further, the means shown for stabilizing the mechanism against accidental movement beyond lap position comprises a yieldable mechanism which is carried by the triple valve piston stem and which is adapted to cooperate with the triple valve piston and main slide valve to prevent accidental movement of the triple valve parts to release facilitating position under the influence of fluctuations in brake pipe pressure when an application of the brakes has been effected.

It will be noted that in the apparatus just described, the construction of the release facilitating stabilizing mechanism is such that when it is desired to incorporate it in an already existing triple valve device the combined triple valve piston and stem must be replaced by a new one especially constructed to properly cooperate with the stabilizing mechanism. It will be further noted that the mechanism employed for separating the slide valve chamber of the triple valve device from the auxiliary reservoir is shown integrally connected with the body of the triple valve casing so that if the mechanism is to be incorporated in an existing triple valve device, a new triple valve body must be substituted for the old one and new connections must be made between the auxiliary reservoir and the slide valve chamber of the triple valve device. Instead of providing a new body casing it may be possible to machine a suitable clamping face on the old casing and clamp the casing of the mechanism thereto, but even if this were done the new connections between the auxiliary reservoir and slide valve chamber would have to be made. Any or all of these changes or alterations would obviously be very costly.

The principal object of the present invention is to provide an improved release facilitating means and stabilizing mechanism which is simple in construction and which may be incorporated in an existing triple valve device without having to change either the triple valve piston and stem or the body casing of the device.

Another object of the invention is to provide the main slide valve of a triple valve device with a combined release facilitating valve mechanism and stabilizing mechanism which at one time is adapted to prevent accidental movement of the triple valve parts to their release facilitating position under the influence of unavoidable fluctuations in brake pipe pressure and at another time to cut off communication between the valve chambers and the auxiliary reservoir so as to assist in facilitating the release of the brakes.

These and other objects will appear in the following more detailed description of the invention.

Figure 4:
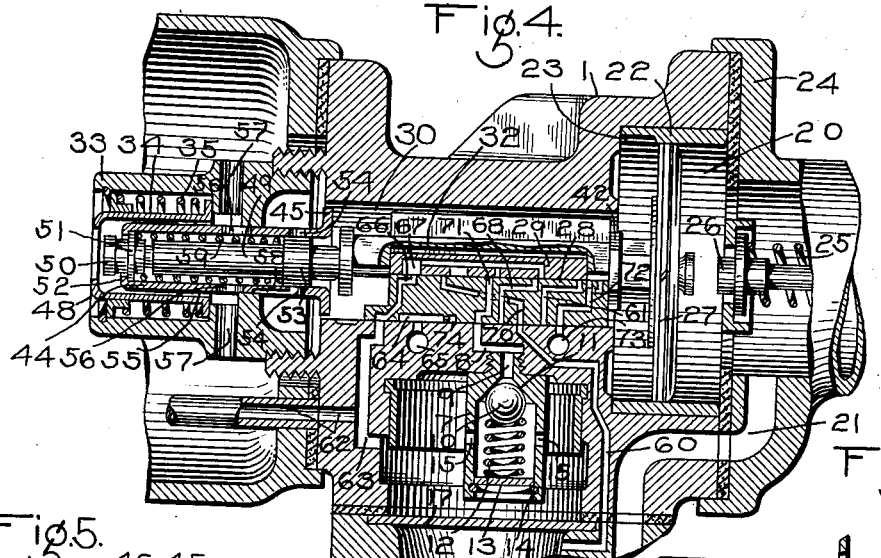
Figures 5, 6, 7:
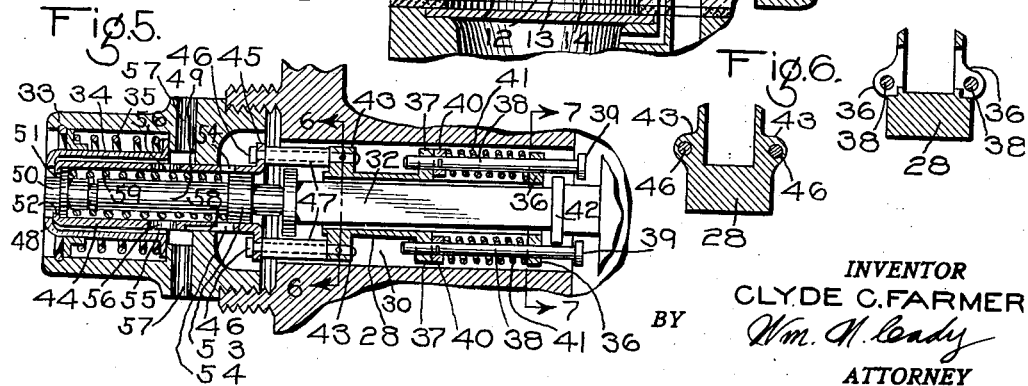

In the accompanying drawings; Fig. 1 is a view of a car fluid pressure brake equipment showing the triple valve device thereof in section, with the moving parts of the triple valve device in normal release position, and embodying my invention; Fig. 2 is a fragmentary sectional view of the triple valve device, showing the moving parts in initial quick service position; Fig. 3 is a fragmentary sectional view of the triple valve device, showing the moving parts in service position; Fig. 4 is a fragmentary sectional view of the triple valve device, showing the moving parts after movement from service lap position upon an increase in brake pipe pressure; and Fig. 5 is a fragmentary horizontal sectional view taken on the line 5—5 of Fig. 1, the triple valve piston stem being shown in plan; Fig. 6 is a cross-sectional view through the main slide valve of the triple valve device taken on the line 6—6 of Fig. 5; Fig. 7 is a cross-sectional view taken through the main slide valve on the line 7—7 of Fig. 5; and Fig. 8 is a cross-sectional view taken on the line 8—8 of Fig. 1.

As shown in the accompanying drawings, the equipment may comprise a triple valve device 1, a brake pipe 2, an auxiliary reservoir 3, and a brake cylinder 4.

The triple valve device 1 in the present embodiment of the invention is of the well known K type which has been modified in accordance with the showing in my aforementioned Patent No. 1,986,470 and also in accordance with the present invention.

In modifying an old triple valve device, the quick action mechanism is removed from the triple valve casing 5 leaving the chamber 6, which contained the quick action mechanism, open at one end. Contained in the chamber 6 is a check valve device comprising a hollow cage 7 which, at one end, has screw-threaded connection with the casing 5 within a passage 8, through which fluid under pressure was formerly adapted to be supplied to the chamber 6 in effecting either a service or an emergency application of the brakes, this end of the check valve casing having a passage 9 open to the passage 8. A check valve in the form of a ball 10 is contained in the cage 7, said check valve being constantly urged toward its seat 11 by the action of a spring 12 which is seated on a spring seat 13 held in the cage by a snap ring 14 which is snapped into a groove formed in the wall of the cage. The interior of the check valve cage is open to the chamber 6 through openings 15 provided in the wall of the cage. The check valve 10 is provided for the purpose of preventing back flow of fluid from the chamber 6 to the passage 9.

After the check valve device is thus secured to the triple valve casing 5, the old check valve casing 16 from which the check valve mechanism has been removed, is again secured to the triple valve casing in its original position, there being a new element in the form of a plate 17 clamped between the triple valve casing and the check valve casing. The plate 17 fits in the recess in the check valve casing, which formerly accommodated the combined guide and valve seat member of the quick action mechanism, and closes off the chamber 6 from a chamber 18 in the check valve casing, which latter chamber is connected to the brake pipe 2 by way of a pipe 19 and to the triple valve piston chamber 20 by way of a passage 21.

The old triple valve piston bushing is removed from the casing 5 and a new bushing 22 substituted having a feed groove 23 formed therein which is of less length than the feed groove in the old bushing.

The old piston chamber cap 24 carrying the graduating spring 25 and stop 26 is used without change and is secured, in its original position, to the casing 5 in the usual manner.

The old triple valve piston 27 is used without change and a new main slide valve 28 and a new graduating slide valve 29 are substituted for the old slide valves and are contained in the valve chamber 30 which is open, through a communication hereinafter more fully described, to the auxiliary reservoir 3. These valves are adapted to be operated through the medium of the piston stem 32 which has been slightly modified by lengthening the graduating valve receiving notch to accommodate the new graduating valve which is longer than the old valve.

The old retarded release stop and spring as well as the cage in which they are mounted are removed and in their stead a new cage 33, stop 34 and spring 35 are substituted, the cage 33 being secured to the triple valve casing 5 in the usual manner.

The main slide valve 28 is provided on each side of its longitudinal center line with longitudinally spaced laterally extending lugs 36 and 37 in which there is slidably mounted a longitudinally extending pin or bolt 38 having a head 39 at one end and having adjacent its other end a stop collar 40 which, as shown in Fig. 9, is normally engaged by the lug 37, said collar being held in such position by a spring 41 which is interposed between and engages the collar and lug 36. With the collar 40 in engagement with the lug 37 the head 39 of the pin is spaced some distance outwardly from the lug 36 and is adapted to be engaged by the collar 42 carried by the piston stem 32 as will hereinafter more fully appear. In the normal release position of the piston stem the collar 42 is in spaced relation with the head 39 of the bolt 38 as shown in Fig. 5.

The main slide valve is also provided on each side of its longitudinal center line with a laterally extending lug 43 which is spaced from the lug 37.

The lugs 43 are located adjacent the rear end of the main slide valve and secured to these lugs and extending rearwardly thereof is a combined stabilizing and release facilitating mechanism which, as will be hereinafter more fully described, is at one time adapted to stabilize the moving parts of the triple valve device against accidental movement from service lap position to release facilitating position, and at another time to facilitate the release of movement of the triple valve parts. This mechanism may comprise a tubular member 44 which is spaced longitudinally from the rear end of the main slide valve and from the rear end of the piston stem. The right hand end of the member is provided with an annular laterally extending flange 45 which is secured to the lugs 43 by means of longitudinally extending pins or bolts 46 which pass through the lugs 43 and flange 45, the pins carrying spaces 47 which extend between and engage the flange and lugs to maintain the member and main slide valve spaced apart. From this it will be apparent that no relative movement between the member and slide valve is permitted.

The member 44 is slidably mounted in the retarded release spring cage 33 so as to be freely movable back and forth with the main slide valve in the direction of its length.

The rear end portion of the member 44 extends into the retarded release stop 34 and with the main slide valve in release position as shown in Figs. 1 and 5 the extreme rear end of the member is engaged by an inwardly extending rear flange 48 of the stop, which stop is maintained in its normal position by the action of the spring 35.

Contained in the member 44 is a plunger 49 having at its rear end a head 50 which is freely movable through a central opening in the rear end of the member and through a central opening in the rear end of the retarded release stop 34, and adjacent the head 50 there is slidably mounted on the plunger a spring seat 51 which seats on an annular flange 52 with which the member is provided. With the main slide valve and piston in their normal release position as shown in Figs. 1 and 5, the forward end of the plunger is in engagement with the rear end of the piston stem. The plunger, at a point a short distance rearwardly of its forward end is provided with a circular valve 53 which slidably engages the inner surface of the member 44, the valve fitting the casing so closely that it will not permit any appreciable flow of fluid from one side thereof to the other. This valve is movable to control ports 54 in the member 44 which are adapted to connect the interior of the member with the triple valve slide valve chamber 30. The interior of the member 44 is constantly open to a chamber 55 through ports 56 in the member, the chamber 55 being constantly connected through passages 57 to the auxiliary reservoir 3. It will be seen from the foregoing description that with the triple valve parts in release position the chamber 55 and consequently the auxiliary reservoir is connected to the triple valve slide valve chamber 30 by way of ports 56, the interior of the member 44 and ports 54 and is further connected to the slide valve chamber by way of a cavity 58 in the member 44.

Interposed between and engaging the valve 53 and spring seat 51 is a spring 59 which, with the triple valve parts in release position, holds the spring seat in engagement with the head 50 of the plunger.

In operation, to initially charge the equipment, fluid under pressure is supplied to the brake pipe 2 in the usual manner and flows therefrom through pipe 19 to the chamber 18 in the cap 16 and from thence through passage 21 to the triple valve piston chamber 20. With the triple valve device in full release position as shown in Fig. 1 of the drawings, fluid under pressure supplied to the chamber 18 also flows through a passage 60 and a port 61 in the main slide valve 28 to the valve chamber 30 and from thence flows through ports 54 in the member 44, the interior of the member, ports 56 in the member, chamber 55 and passages 57 in the cage 33.

Further, with the triple valve device in full release position, the brake cylinder 4 is connected to the atmosphere by way of pipe and passage 62, passage 63, a cavity 64 in the main slide valve 28 and a passage 65. The chamber 6 is also connected to the atmosphere by way of passage 63.

When it is desired to effect a service application of the brakes, fluid under pressure is gradually vented from the brake pipe 2 and the connected triple valve piston chamber 20 through the medium of the usual brake valve device, not shown. When the pressure of fluid in piston chamber 20 is thus reduced to slightly below the pressure of fluid in valve chamber 30, the piston 27 moves outwardly toward service position, shifting the graduating slide valve 29 in the same direction relative to the main slide valve 28. As the graduating slide valve is thus shifted it laps the port 61 in the main slide valve 28 thereby preventing back flow of fluid from the valve chamber 30 and auxiliary reservoir 3 to the brake pipe and also uncovers a service port 66 in the main slide valve.

After the port 61 is thus lapped, the collar 42 of the piston stem 32 engages the rear faces of the heads 39 of the pins 38 and causes said pins to be moved outwardly against the opposing action of the springs 41 until such time as the shoulder on the rear end of the piston stem engages the rear end of the main slide valve, when further movement of the piston will cause both valves to be moved in unison toward application position. As the piston, piston stem and auxiliary slide valve continue to move relative to the main slide valve, a cavity 67 in the auxiliary slide valve connects the port 61 to a port 68 in the main slide valve, which latter port is connected to the passage 8. When this connection is established, fluid under pressure is vented from the brake pipe to the atmosphere by way of pipe 19, chamber 18, passage 60, port 61 in the main slide valve, cavity 67 in the auxiliary slide valve, port 68, passage 8, passage 9 in the check valve cage 7, past the ball check valve 10, openings 15 in the cage 7, chamber 6, passage 63, cavity 64 and passage 65, causing a local reduction in brake pipe pressure which acts to hasten the movement of the triple valve parts of the next car in a train to initial quick service position. The triple valve device of the next car then functions in a similar manner and in this way a quick response to the brake pipe reduction is transmitted serially throughout the length of the train.

The initial local reduction in brake pipe pressure also acts to hasten the movement of the local triple valve parts to brake application position, and further insures the movement of the triple valve parts toward application position.

When the piston 27 and graduating slide valve 29 moves to initial quick service position, the shoulder on the rear end of the piston stem is brought into engagement with the rear end of the slide valve 28 so that upon further movement of the piston towards service position, the main slide valve will be shifted in the same direction.

The main slide valve, as it is thus moved, cuts off the communication from the brake pipe passage 60 to the ports 61 and also cuts off communication from the brake cylinder passage 63 to the atmospheric passage 65. A further forward movement of the main slide valve now causes the service port 66 to be connected to the brake cylinder passage 63 so that fluid under pressure is now supplied from the auxiliary reservoir to the brake cylinder 4. At substantially the same time as the service port is connected to the brake cylinder passage, a port 70 in the main slide valve registers with the brake pipe passage 60 and a port 71 registers with the passage 8, which ports have been previously connected together by the cavity 67 in the auxiliary slide valve 29, so that fluid under pressure is now vented from the brake pipe to the brake cylinder by way of pipe 19, chamber 18, passage 60, port 70, cavity 67, port 71, passage 8, past the ball check valve 10, openings 15 in the check valve cage 7, chamber 6, passage 63 and passage and pipe 62.

When the triple valve parts have been shifted to final quick service position, as just described, the piston 27 engages the stop 26, after which the further movement of the piston and slide valve toward full service position is yieldably resisted by the graduating spring 25. The triple valve parts upon reaching full service position, as shown in Fig. 3, will come to a stop due to the quick service communication from the brake pipe being cut off and the increase in the rate of flow of fluid from the auxiliary reservoir to the brake cylinders. In the event of the triple valve parts moving outwardly beyond full service position the capacity of the service port is increased and the rate of decrease in auxiliary reservoir pressure is correspondingly increased. By this means the triple valve parts are prevented from unintentionally moving to emergency application position during a service application of the brakes.

It will be here understood that in the present embodiment of my invention, the final quick service venting of fluid from the brake pipe to the brake cylinder and the movement of the triple valve parts from quick service position to full service position are accomplished in substantially the same manner as in the standard K type of triple valve device, and since this feature is well known by those skilled in the art, a more detailed description dealing with the relative sizes and shape of the service and quick service ports and passages is deemed unnecessary.

After the auxiliary reservoir pressure has been reduced by flow to the brake cylinder in a service application of the brakes to substantially equal the pressure in the brake pipe, the piston 27 shifts the graduating valve rearwardly relative to the main slide valve to lap position in which the flow of fluid from the auxiliary reservoir to the brake cylinder is closed off. If the main slide valve should be in quick service position when the piston moves to lap position the auxiliary slide valve will lap the quick service ports 70 and 71 in the main slide valve so that no further quick service flow of fluid from the brake pipe will occur.

If the triple valve parts should be in full service position when the piston moves to lap position the quick service ports 70 and 71 will be lapped by the graduating valve, but this is of no consequence since the main slide valve in full service position closes the communication from the brake pipe to the brake cylinder.

It will be noted that as the main slide valve is being moved to service position the member 44, plunger 49, and spring 59 move with it as a unit so that these parts will have no effect upon movement of the main slide valve in effecting an application of the brakes. It is however, to be noted that when the main slide valve is in service position, direct communication between the cavity 58 and chamber 55 is cut off. The purpose of this will hereinafter be more fully described in connection with the release of the brakes.

With the auxiliary slide valve 29 in service lap position, the collar on the rear end of the piston stem is engaged by the forward end of the plunger 49.

When it is desired to effect the release of the brakes, the brake pipe pressure is increased in the usual manner. It will now be noted that movement of the piston 27 to the left from service lap position toward release position is opposed by the resistance of the spring 59 acting through the medium of the plunger 49 and the frictional resistance of the piston 27 and graduating valve 29, so that when the brake pipe pressure has been increased above the auxiliary reservoir pressure a predetermined amount sufficient to overcome the resistance of the spring 27 and the frictional resistance of the piston 27 and the valve 29, the piston 27 will be moved to the left so as to shift the graduating valve 29 to the position in which it is shown in Fig. 4. The required differential of pressures between the auxiliary reservoir and the brake pipe necessary to move the piston 27 depends upon the resistance value of the spring 59 and preferably the spring is such that the piston 27 will be moved when the brake pipe pressure has been increased to about one and one-half pounds above the auxiliary reservoir pressure.

In moving to the position shown in Fig. 4, the piston stem 32 moves the plunger 49 rearwardly to the position in which it is shown, in which position the valve 53 closes the ports 54 in the member 44 and thus cuts off communication from the auxiliary reservoir to the slide valve chamber 30. The auxiliary slide valve 29 in moving to this position operates to uncover a port 72 in the main slide valve, which port, with the main slide valve in service position, is in communication with a passage 73 leading to the atmosphere, so that fluid under pressure is now vented from the valve chamber 30 to the atmosphere through port 72 and passage 73. The reduction of the pressure in fluid in the slide valve chamber 30 continues until the differential pressure between the chamber and the brake pipe is sufficient to permit the piston 27 to move the main slide valve 28.

With the movable parts of the triple valve device in the position in which they are shown in Fig. 4, the collar 42 of the triple valve piston stem 32 is in engagement with the forward end of the main slide valve 28, so that upon movement of the piston 27 towards the left from this position causes movement of the main slide valve 28. Initial movement of the main slide valve in this direction causes the port 72 to be moved out of registry with the exhaust passage 73 so that further venting of fluid from the valve chamber is prevented. Continued movement of the piston 27, main slide valve 28 and auxiliary slide valve 29 causes the cavity 64 to connect passage 63 with the exhaust passage 65, so that fluid is released from the brake cylinder.

At substantially the same time as the cavity 64 in the main slide valve connects the passages 63 and 65 together, the port 61 in the main slide valve is brought into registration with the brake pipe passage 60, so that fluid under pressure flows by way of this passage and port from the brake pipe to the valve chamber 30 and from said chamber flows through cavity 58 in the member 44 to chamber 55 and consequently to the auxiliary reservoir, the cavity 58 having been moved to establish communication between the chambers 30 and 55 just prior to port 61 being brought into registration with the passage 60.

On the cars at the rear end of the train where the rise in brake pipe pressure may be slow, the triple valve piston and slide valves will be brought to a stop when the rear end of the members is engaged by the retarded release stop 34. When the main slide valve is thus stopped it will be in its normal or full release position.

After the pressures in the slide valve chamber 30 and brake pipe has substantially equalized, the spring 59, acting through the medium of the plunger 49, causes the piston 27 and auxiliary slide valve 29 to move forwardly to their normal release position relative to the main slide valve as shown in Fig. 1. As the plunger is moved toward the right by the action of the spring 59, the valve 53 carried by the plunger uncovers the ports 54 so that fluid under pressure flows from the valve chamber 30 to the auxiliary reservoir by way of both the cavity 58 and ports 54 in the member 44.

At the head end of the train where the increase in brake pipe pressure is more rapid, the triple valve piston 27 and slide valves 28 and 29 will move to retarded release position, against the resistance of spring 35 acting through the medium of the retarded release stop 54 and member 44 carried by the main slide valve 28. In this position, the brake cylinder passage 63 is connected to the exhaust passage 65 through a restricted extension 74 of the cavity 64, so that the release of fluid from the brake cylinder is retarded in this position.

After the pressures in the slide valve chamber 30 and brake pipe has substantially equalized, the spring stop 34, acting through the medium of the member 44 moves the main slide valve 28 back to full release position, as shown in Fig. 1, and the spring 59, acting through the medium of the plunger 49, moves the piston stem 32 and thereby the auxiliary slide valve 29 and piston 27 relative to the main slide valve 28 to the position in which they are shown in Fig. 1. As the plunger 49 is thus being moved, the valve 53 carried thereby uncovers the port 54, thus establishing an additional communication between the slide valve chamber and auxiliary reservoir so that the auxiliary reservoir is now charged by way of both the cavity 58 and ports 54 with fluid under pressure from the slide valve chamber 30.

The cavity 58 in the member 44 is provided chiefly for the purpose of insuring the provision of an open communication between the auxiliary reservoir and valve chamber 30 when the triple valve parts are in their retarded release position and the valve 53 is in lapping relationship with the ports 53.

It will be seen that with my improvement after a service application of the brakes, upon a light, but predetermined increase in brake pipe pressure, the triple valve devices throughout the train are positively moved to release position and that the release facilitating means functions to prevent any appreciable reduction in the already reduced auxiliary reservoir pressure. It will also be seen that with my improvements the moving parts of the triple valve device in moving to service lap position will be stabilized against accidental movement from service lap position to release facilitating position, thus insuring against the accidental release of the brakes.

While one illustrative embodiment of the invention has been described in detail it is not my intention to limit its scope to that embodiment or otherwise than by the terms of the appended claims.

Having now described my invention, what I claim as new and desire to secure by Letters Patent, is:

1. In a fluid pressure brake, in combination, a brake pipe, an auxiliary reservoir, a brake cylinder, a triple valve device comprising a main valve, an auxiliary valve and a piston subject to the opposing pressures of the brake pipe and a chamber normally connected to the auxiliary reservoir and operated upon a reduction in brake pipe pressures for actuating said valves to supply fluid under pressure from the auxiliary reservoir to the brake cylinder to effect a service application of the brakes, said piston being adapted to move the auxiliary valve relatively to the main valve to service lap position, in which the supply of fluid under pressure from the auxiliary reservoir is cut off, and being adapted to move the auxiliary valve relatively to the main valve beyond service lap position to vent fluid under pressure from said chamber, and means preventing said further movement of the piston and auxiliary valve relative to the main valve until a predetermined differential in pressure between the brake pipe and said chamber has been created, and operative upon said differential pressure being created for cutting off communication between the auxiliary reservoir and chamber.

2. In a fluid pressure brake, in combination, a brake pipe, an auxiliary reservoir, a brake cylinder, a triple valve device comprising a main valve, an auxiliary valve and a piston subject to the opposing pressure of the brake pipe and a chamber normally connected to the auxiliary reservoir and operated upon a reduction in brake pipe pressure for actuating said valves to supply fluid under pressure from the auxiliary reservoir to the brake cylinder to effect a service application of the brakes, said piston being adapted to move the auxiliary valve relatively to the main valve to service lap position, in which the supply of fluid under pressure from the auxiliary reservoir is cut off, and being adapted to move the auxiliary valve relatively to the main valve beyond service lap position to vent fluid under pressure from said chamber, and means carried by the main valve for preventing said further movement of the piston and auxiliary valve relative to the main valve until a predetermined differential in pressure between the brake pipe and said chamber has been created, and operative upon said further movement of the auxiliary valve for cutting off communication between the auxiliary reservoir and chamber.

3. In a fluid pressure brake, in combination, a brake pipe, an auxiliary reservoir, a brake cylinder, a triple valve device comprising a main valve, an auxiliary valve and a piston subject to the opposing pressures of the brake pipe and a chamber normally connected to the auxiliary reservoir and operated upon a reduction in brake pipe pressure for actuating said valves to supply fluid under pressure from the auxiliary reservoir to the brake cylinder to effect a service application of the brakes, said piston being adapted to move the auxiliary valve relatively to the main valve to service lap position, in which the supply of fluid under pressure from the auxiliary reservoir is cut off, and being adapted to move the auxiliary valve relatively to the main valve beyond service lap position to vent fluid under pressure from said chamber, and means carried by the main valve and cooperating with said piston for preventing said further movement of the piston and auxiliary valve relative to the main valve until a predetermined differential in pressure between the brake pipe and said chamber has been created and operative by said piston upon said further movement of the piston for cutting off communication between the auxiliary reservoir and chamber.

4. In a fluid pressure brake, a brake pipe, an auxiliary reservoir, and a brake cylinder, a triple valve device having a chamber normally open to the auxiliary reservoir and operated upon a reduction in brake pipe pressure for supplying fluid under pressure from said chamber and the auxiliary reservoir to the brake cylinder and upon an increase in brake pipe pressure after a reduction in brake pipe pressure for venting fluid from said chamber, means for normally opposing movement of the triple valve device to its venting position and for cutting off communication between said auxiliary reservoir and chamber.

5. In a fluid pressure brake, a brake pipe, an auxiliary reservoir, a brake cylinder, a triple valve device comprising valve means contained in a valve chamber normally open to the auxiliary reservoir, a piston operated upon a reduction in brake pipe pressure for actuating said valve means to supply fluid under pressure from said valve chamber and auxiliary reservoir to the brake cylinder and operated upon an increase in brake pipe pressure in initiating the release of the brakes to operate said valve means for venting fluid from said valve chamber, and means operated by said piston upon movement thereof to effect the venting of fluid from said valve chamber for cutting off communication between the auxiliary reservoir and said valve chamber.

6. In a fluid pressure brake, a brake pipe, an auxiliary reservoir, a brake cylinder, a triple valve device having a valve chamber normally open to the auxiliary reservoir and operated upon a reduction in brake pipe pressure for supplying fluid under pressure from said valve chamber and auxiliary reservoir to the brake cylinder and operated upon an increase in brake pipe pressure for first venting fluid from said valve chamber and then from the brake cylinder, and means operated by said piston for cutting off communication between the auxiliary reservoir and said chamber.

7. In a fluid pressure brake, a brake pipe, an auxiliary reservoir, a brake cylinder, a triple valve device having a valve chamber normally open to the auxiliary reservoir and operated upon a reduction in brake pipe pressure for supplying fluid under pressure from said valve chamber and auxiliary reservoir to the brake cylinder and operated upon an increase in brake pipe pressure for first venting fluid from said valve chamber and then from the brake cylinder, and means operated by said piston in its movement to the first venting position for cutting off communication between the auxiliary reservoir and said chamber.

8. In a fluid pressure brake, a brake pipe an auxiliary reservoir, a brake cyilnder, a triple valve device having a valve chamber normally open to the auxiliary reservoir and operated upon a reduction in brake pipe pressure for supplying fluid under pressure from said valve chamber and auxiliary reservoir to the brake cylinder and operated upon an increase in brake pipe pressure for first venting fluid from said valve chamber and then from the brake cylinder, and means carried by said valve means and operated by said piston in its movement to the first venting position for cutting off communication between the auxiliary reservoir and said chamber.

9. In a fluid pressure brake, a brake pipe, an auxiliary reservoir, a brake cylinder, a triple valve device comprising valve means contained in a valve chamber normally open to the auxiliary reservoir, a piston operated upon a reduction in brake pipe pressure for actuating said valve means to supply fluid under pressure from said valve chamber and auxiliary reservoir to the brake cylinder and operated upon an increase in brake pipe pressure in initiating the release of the brakes to operate said valve means to vent fluid from said valve chamber, and means carried by said valve means and operated by said piston in moving said valve means to vent fluid from said chamber, for cutting off communication between the auxiliary reservoir and said chamber.

10. In a fluid pressure brake, a brake pipe, an auxiliary reservoir, a brake cylinder, a triple valve device comprising valve means contained in a valve chamber normally open to the auxiliary reservoir, a piston operated upon a reduction in brake pipe pressure for actuating said valve means to supply fluid under pressure from said valve chamber and auxiliary reservoir to the brake cylinder and operated upon an increase in brake pipe pressure in initiating the release of the brakes to operate said valve means for venting fluid from said valve chamber, and valve means operated by said piston upon movement of the piston for actuating said valve means to vent fluid from the chamber to cut off communication between the auxiliary reservoir and said valve chamber.

11. In a fluid pressure brake, a brake pipe, an auxiliary reservoir, a brake cylinder, a triple valve device having a valve chamber normally open to the auxiliary reservoir and operated upon a reduction in brake pipe pressure for supplying fluid under pressure from said valve chamber and the auxiliary reservoir to the brake cylinder and upon an increase in brake pipe pressure after a reduction in brake pipe pressure for venting fluid from said valve chamber, and means yieldably opposing movement of the triple valve device to the position in which it vents fluid under pressure from said chamber and operated upon movement of the triple valve device to said venting position for cutting off communication between said auxiliary reservoir and said chamber.

12. In a fluid pressure brake, a brake pipe, an auxiliary reservoir, a brake cylinder, a triple valve device comprising valve means contained in a chamber normally open to the auxiliary reservoir, a piston subject to the opposing pressures of said chamber and brake pipe and operated upon a reduction in brake pipe pressure for actuating said valve means to supply fluid under pressure from said chamber and reservoir to the brake cylinder and operated upon an increase in brake pipe pressure to operate said valve means to vent fluid under pressure from said chamber, a casing member movable with said valve means and adapted to establish communication between the chamber and the auxiliary reservoir, and means slidably mounted in said casing and movable relative thereto by said piston upon movement of the piston to actuate said valve means to vent fluid under pressure from said chamber for closing said communication.

13. In a fluid pressure brake, a brake pipe, an auxiliary reservoir, a brake cylinder, a triple valve device comprising a main valve, an auxiliary valve, and a piston subject to the opposing pressures of the brake pipe and a chamber normally open to said auxiliary reservoir for operating said valves, said triple valve device having a service application position, a service lap position, and a release position, means permitting a movement by said piston of said auxiliary valve relative to the main valve from service lap position toward release position, in which movement, fluid is vented from said chambers, and operative upon movement of the piston from service lap position for closing communication between said auxiliary reservoir and said chamber.

CLYDE C. FARMER.